US010009689B2

(12) United States Patent
Yamada et al.

(10) Patent No.: US 10,009,689 B2
(45) Date of Patent: Jun. 26, 2018

(54) VEHICLE INFORMATION PRESENTATION DEVICE

(71) Applicant: TOYOTA JIDOSHA KABUSHIKI KAISHA, Toyota, Aichi-ken (JP)

(72) Inventors: Yoshinori Yamada, Nagakute (JP); Masaya Watanabe, Miyoshi (JP); Chikashi Takeichi, Miyoshi (JP); Satoshi Arikura, Niwa-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/645,075

(22) Filed: Jul. 10, 2017

(65) Prior Publication Data

US 2018/0077492 A1 Mar. 15, 2018

(30) Foreign Application Priority Data

Sep. 9, 2016 (JP) ................................ 2016-176684

(51) Int. Cl.
*H04B 1/00* (2006.01)
*H04R 3/12* (2006.01)

(52) U.S. Cl.
CPC ........... *H04R 3/12* (2013.01); *H04R 2430/01* (2013.01); *H04R 2499/13* (2013.01)

(58) Field of Classification Search
CPC ............... G10K 2210/1282; G10K 2210/3221
See application file for complete search history.

(56) References Cited

U.S. PATENT DOCUMENTS 9,513,866 B2 * 12/2016 Lu ............................ H04R 5/04
2009/0316939 A1 12/2009 Matsumoto et al.
2012/0230504 A1 * 9/2012 Kuroda ................ G10K 11/178 381/71.4
2016/0029111 A1 * 1/2016 Wacquant .............. H04R 3/005 381/71.4

FOREIGN PATENT DOCUMENTS

JP 2006-194633 A 7/2006
JP 2010-004361 A 1/2010
JP 2013-143744 A 7/2013

* cited by examiner

*Primary Examiner* — Matthew Eason
*Assistant Examiner* — Kile Blair
(74) *Attorney, Agent, or Firm* — Oliff PLC

(57) ABSTRACT

A vehicle information presentation device that includes: an acquisition section configured to acquire information about the surroundings of an ego vehicle; a sound pick-up section configured to pick up sound heard by an occupant; a plurality of sound sources configured to emit sound toward the occupant; and a presentation section that, in a case in which another vehicle has been detected from the surroundings information acquired by the acquisition section, presents the occupant with information related to the other vehicle using sound emitted from at least one of the plurality of sound sources by attenuating, from among sound heard by the occupant, sound directed from the other vehicle toward the ego vehicle, based on audio pick-up information on sound picked up by the sound pick-up section.

7 Claims, 9 Drawing Sheets

FIG.4

42

| PARAMETER / CRITERION | IMPORTANCE (LEVEL) OF INFORMATION | ATTENUATION RATE OF SOUND | SCENARIO |
|---|---|---|---|
| 1 | HIGH | LARGE | • OTHER VEHICLE APPROACHING AT HIGH SPEED AND OVERTAKING<br>• LARGE VEHICLE APPROACHING OR THE LIKE |
| 2 | LOW | SMALL | • OTHER VEHICLE APPROACHING AT SIMILAR SPEED OR SLOWER SPEED OR THE LIKE |

FIG.5

44

| PARAMETER / OPERATION SCENARIO | PRESENTATION MODE OF ATTENUATION (STEREO) | | SCENARIO CONTENT |
|---|---|---|---|
| | PATTERN | ATTENUATION RATE | |
| 1 | RIGHT SIDE | LARGE | • STATE IN WHICH OTHER VEHICLE IS ATTEMPTING TO OVERTAKE FROM THE REAR RIGHT AT A HIGHER SPEED THAN EGO VEHICLE |
| 2 | AT THE CENTER (BOTH SIDES) | SMALL | • STATE IN WHICH OTHER VEHICLE IS APPROACHING FROM REAR AT SLIGHTLY FASTER SPEED THAN EGO VEHICLE |
| 3 | LEFT SIDE | SMALL | • STATE IN WHICH OTHER VEHICLE IS A LARGE VEHICLE TRAVELLING SIDE-BY-SIDE ON THE LEFT OF THE EGO VEHICLE, AND SLIGHTLY APPROACHING THE EGO VEHICLE |

FIG.9

46

| PARAMETER / OPERATION SCENARIO | PRESENTATION MODE OF ATTENUATION (MULTI) | | SCENARIO CONTENT |
|---|---|---|---|
| | PATTERN | ATTENUATION RATE | |
| 1 | REAR → REAR RIGHT → RIGHT → FRONT RIGHT | LARGE | • STATE IN WHICH OTHER VEHICLE IS ATTEMPTING TO OVERTAKE FROM THE REAR RIGHT AT A HIGHER SPEED THAN EGO VEHICLE |
| 2 | REAR | SMALL | • STATE IN WHICH OTHER VEHICLE IS APPROACHING FROM REAR AT SLIGHTLY FASTER SPEED THAN EGO VEHICLE |
| 3 | REAR LEFT → LEFT → FRONT LEFT | SMALL | • STATE IN WHICH OTHER VEHICLE IS A LARGE VEHICLE TRAVELLING SIDE-BY-SIDE ON THE LEFT OF THE EGO VEHICLE, AND SLIGHTLY APPROACHING THE EGO VEHICLE |

VEHICLE INFORMATION PRESENTATION DEVICE

CROSS-REFERENCE TO RELATED APPLICATION

This application is based on and claims priority under 35 USC 119 from Japanese Patent Application No. 2016-176684 filed on Sep. 9, 2016, which is incorporated by reference herein.

BACKGROUND

Technical Field

The present invention relates to a vehicle information presentation device.

Related Art

Technology is known in which speakers are installed in a vehicle, and, based on detection results from detecting conditions surrounding the vehicle, conditions to be presented to an occupant of the vehicle are output as an audio notification from a virtual sound source (see, for example, Japanese Patent Application Laid-Open (JP-A) No. 2010-4361). In this technology, in order to make the occupant aware of an object in front of the vehicle, when an object such as a two wheeled vehicle or the like has been detected, the direction of the object in front of the vehicle, which is the object make the occupant aware of, is determined, and a sound image of a virtual sound source is localized in the direction of the object.

However, various sounds are being emitted within a vehicle. For example, sometimes presentation is made with a caution sound representing information the occupant is prompted to pay attention to, or with a warning sound representing information accompanying a warning. When, in addition to a caution sound or a warning sound, information related to another vehicle in the vicinity of the ego vehicle is presented to the occupant as an audio notification from a virtual sound source, it becomes difficult for the occupant to distinguish between the audio notification, and the caution sound or warning sound, and sometimes the occupant is caused to feel pressured by such audio notification. This approach is accordingly not enough to effectively provide information related to another vehicle in the vicinity of the ego vehicle to the occupant without making the occupant feel pressured.

SUMMARY

In consideration of the above circumstances, an object of the present disclosure is to provide a vehicle information presentation device capable of presenting information related to another vehicle in the vicinity of the ego vehicle without making the occupant thereof feel pressured.

A vehicle information presentation device of an aspect includes an acquisition section configured to acquire information about the surroundings of an ego vehicle, a sound pick-up section configured to pick up sound heard by an occupant, plural sound sources configured to emit sound toward the occupant, and a presentation section. When another vehicle has been detected in the surroundings information acquired by the acquisition section, the presentation section presents the occupant with information related to the other vehicle by, based on audio pick-up information of sound picked up by the sound pick-up section, attenuating sound from the other vehicle direction toward the ego vehicle out of the sound heard by the occupant with sound emitted from at least one of the sound sources from out of the plural sound sources emitting sound.

BRIEF DESCRIPTION OF DRAWINGS

FIG. 4 is a diagram of a relationship map according to the first exemplary embodiment, illustrating an example of associations between importance of information and attenuation rate for attenuating sound.

FIG. 5 is a scenario map according to the first exemplary embodiment, illustrating an example of modes for presenting information by attenuating sound.

FIG. 9 is a scenario map according to the second exemplary embodiment, illustrating an example of modes for presenting information by attenuating sound.

DESCRIPTION OF EMBODIMENTS

Detailed explanation follows regarding examples of exemplary embodiments of the present disclosure, with reference to the drawings.

First Exemplary Embodiment

Figure 1:
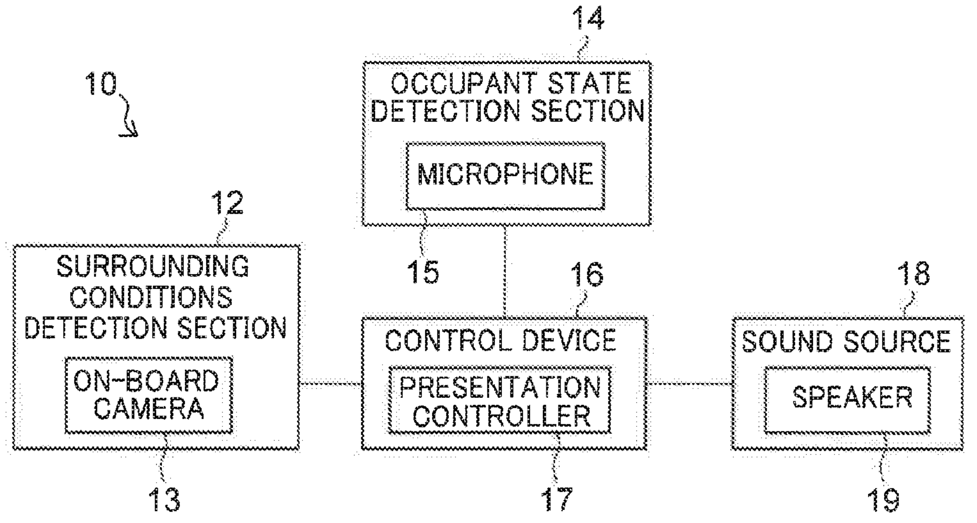
FIG. 1 is a block diagram illustrating an example of a schematic configuration of an on-board device according to a first exemplary embodiment.

FIG. 1 illustrates a schematic configuration of an on-board device 10 according to a first exemplary embodiment. The on-board device 10 is an example of a vehicular information presentation device. The on-board device 10 is installed in a vehicle as a device to present various information to an occupant. In the present exemplary embodiment, explanation follows regarding a case in which various information is presented to a driver, serving as an example of an occupant presented with various information.

The on-board device 10 includes a surrounding conditions detection section 12, an occupant state detection section 14, a control device 16, and a sound source 18.

The surrounding conditions detection section 12 is a functional section that detects the ego vehicle surrounding conditions. In the present exemplary embodiment, the surrounding conditions detection section 12 includes an on-board camera 13 as an example of a detector that detects the ego vehicle surrounding conditions. An omnidirectional camera may, for example, be employed as the on-board camera 13, enabling the ego vehicle surrounding conditions, such as the position of another vehicle, and the travelling state including the speed of the other vehicle, to be detected based on captured images.

In the present exemplary embodiment, explanation follows regarding a case in which the ego vehicle surrounding conditions are detected by the on-board camera 13 in the surrounding conditions detection section 12. However, the present exemplary embodiment is not limited to the on-board camera 13, and may employ any detector that detects the ego vehicle surrounding conditions. Examples of detectors to detect the ego vehicle surrounding conditions include sensors such as infrared sensors and Doppler sensors. The ego vehicle surrounding conditions may be detected by such sensors as these infrared sensors and Doppler sensors. Other examples of detectors include communication units that receive a travelling state of another vehicle relative to the ego vehicle by vehicle-to-vehicle communication between the ego vehicle and the other vehicle. Further examples of detectors include communication units that receive road conditions by roadside-to-vehicle communication, such as wireless communication units using narrow band communication, such as dedicated sort range communications (DSRC).

The occupant state detection section 14 is a functional section that detects a state of the driver. Examples of a state of the driver in the present exemplary embodiment include sounds heard by the driver using their auditory sense. In the present exemplary embodiment, the occupant state detection section 14 includes a microphone 15, such as a microphone that picks up sound heard by the driver, and is installed around the driver to enable the detection of sound heard by the driver using the microphone 15.

The sound source 18 is a functional section that generates sound to attenuate the sound heard by the driver, and includes a speaker 19 that generates sound based on audio information input from the control device 16.

The control device 16 is a functional section that employs the images captured by the on-board camera 13 and various information about the sound picked up by the microphone 15 to generate audio information, and outputs the audio information to the speaker 19 of the sound source 18. The control device 16 includes a presentation controller 17 that controls the sound generated by the speaker 19. The presentation controller 17 is what is referred to as an active noise controller, and includes functionality to use the various information about the sound picked up by the microphone 15 to perform control such that sound to attenuate the sound heard by the driver is emitted by the speaker 19. Namely, the presentation controller 17 generates audio information representing sound of the opposite phase to the sound picked up by the microphone 15, and outputs the audio information to the speaker 19. Due to the speaker 19 emitting sound based on the input audio information, the sound heard by the driver is attenuated by the sound of opposite phase thereto.

The presentation controller 17 of the control device 16 has functionality to identify a position of another vehicle, or a direction from the other vehicle toward the ego vehicle, in cases in which another vehicle has been detected based on images captured by the on-board camera 13. Namely, the presentation controller 17 detects another vehicle in images captured by the on-board camera 13, and identifies the position of the other vehicle or the direction from the other vehicle toward the ego vehicle. In cases in which the sound source 18 includes plural speakers 19, the information representing the identified position of the other vehicle, or the identified direction from the other vehicle toward the ego vehicle, is employed as information to identify which speaker 19 from out of the plural speakers 19 to perform sound attenuation control on. Namely, the presentation controller 17 is able to perform sound attenuation control on whichever of the speakers 19 corresponds to the position of the other vehicle, or to the direction from the other vehicle toward the ego vehicle.

Thus, in the on-board device 10 the sound heard by the driver and picked up by the microphone 15 is picked up as sound in cases in which another vehicle has been detected by the on-board camera 13. The presentation controller 17 generates audio information to attenuate the sound heard by the driver based on audio pick-up information of the picked up sound, and outputs the generated audio information to the speaker 19. The sound heard by the driver is accordingly attenuated by sound emitted by the speaker 19, enabling information related to another vehicle in the vicinity of the ego vehicle to be presented to the driver without causing the driver to feel pressured.

Note that the surrounding conditions detection section 12 serves as an example of an acquisition section, and the occupant state detection section 14 serves as an example of a sound pick-up section. The sound source 18 serves as an example of a sound source, and the control device 16 serves as an example of a presentation section.

Figure 2:
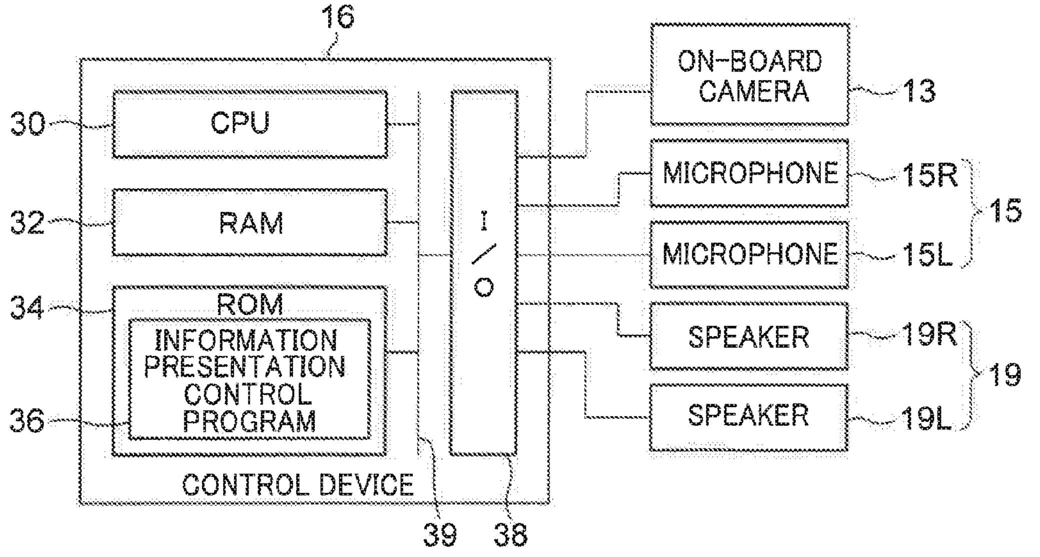
FIG. 2 is a block diagram illustrating an example of a schematic configuration of a control device according to the first exemplary embodiment.

FIG. 2 illustrates an example of a schematic configuration of a case in which the control device 16 according to the present exemplary embodiment is implemented by a computer. As illustrated in FIG. 2, the control device 16 includes a CPU 30, RAM 32, ROM 34 serving as a non-volatile storage section for storing an information presentation control program 36, and an input/output interface section (I/O) 38 for communication with external devices, with these sections mutually connected by a bus 39. The on-board camera 13, the microphone 15, and the speaker 19 illustrated in FIG. 1 are connected to the I/O 38. In the present exemplary embodiment, the microphone 15 and the speaker 19 include microphones 15R, 15L and speakers 19R, 19L respectively corresponding to the left and right sides of the driver (see FIG. 3). The control device 16 reads the information presentation control program 36 from the ROM 34, and expands the information presentation control program 36 in the RAM 32. The control device 16 functions as the presentation controller 17 illustrated in FIG. 1 by the CPU 30 executing the information presentation control program 36 expanded in the RAM 32.

Figure 3:
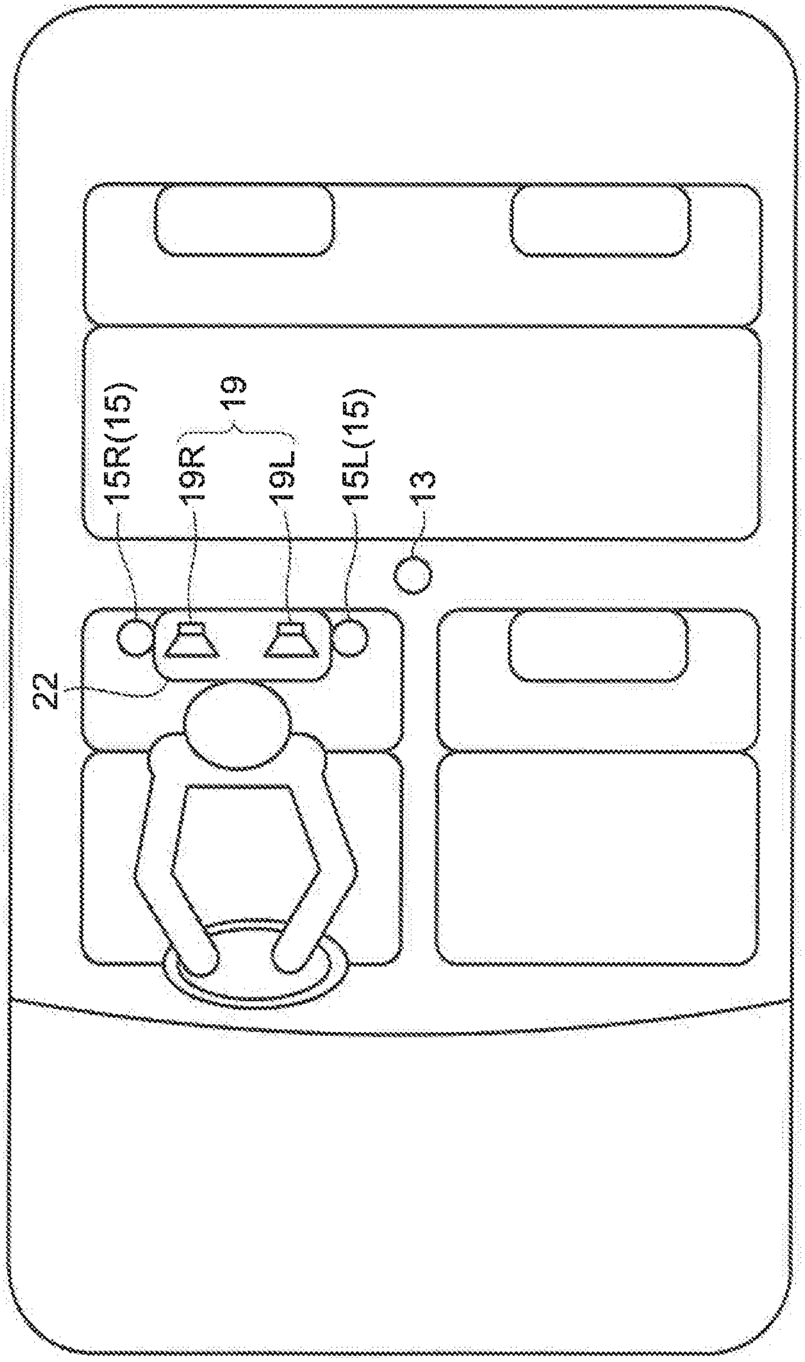
FIG. 3 is a block diagram illustrating an example of an arrangement according to the first exemplary embodiment for an on-board camera, microphone, and speakers installed in a vehicle.

FIG. 3 illustrates an example of an installation arrangement in a vehicle of the on-board camera 13, the microphone 15, and the speaker 19 illustrated in FIG. 1.

As illustrated in FIG. 3, the microphone 15 and the speaker 19 corresponding to the directions of sound heard by the driver are installed in a headrest 22 attached to a seat on which the driver seats. Namely, a microphone 15R is installed on the right side of the headrest 22 to pick up the sound heard by the right ear of the driver, and a microphone 15L is installed on the left side of the headrest 22 to pick up the sound heard by the left ear of the driver. A speaker 19R is installed on the right side of the headrest 22 to present sound toward the right ear of the driver based on audio information input from the control device 16, and a speaker 19L is installed on the left side of the headrest 22 to present sound toward the left ear of the driver based on audio information input from the control device 16.

The speaker 19R and the speaker 19L installed in the headrest 22 function as the speaker 19 to be controlled to present the driver with information related to another vehicle. Namely, in cases in which another vehicle has been detected, information representing the detected position of the other vehicle, or the direction from the other vehicle toward the ego vehicle, is associated with a direction to present attenuated sound to the driver, which is the direction in which it is desired to convey information to the driver, as the information related to another vehicle. Thus, for example, the speaker 19 corresponding to the direction from the other vehicle toward the ego vehicle is set as the speaker 19 to control, enabling the presentation of information related to the other vehicle, including a positional relationship of the other vehicle to the ego vehicle, by using the sound of the speaker 19 subject to control to attenuate sound. More specifically, when presenting information, in cases in which the direction in which it is desired to present information to the driver is the right side, sound based on the audio information is caused to be emitted by the speaker 19R, and in cases in which it is the left side, sound based on the audio information is caused to be emitted by the speaker 19L. Moreover, in cases in which the direction of the information is at the center, sound is caused to be emitted by both the speaker 19R and the speaker 19L.

An omnidirectional camera is employed as an example of the on-board camera 13 in the present exemplary embodiment. An omnidirectional camera is able to obtain images captured of conditions inside and outside the ego vehicle. The omnidirectional camera employed as the on-board camera 13 is installed to a ceiling section of the ego vehicle.

The speaker 19 is installed within the headrest 22 of the vehicle. The speaker 19 emits sound so as to present audio information to the driver, enabling a sound field to be established in the space around the driver by the sound emitted by the speaker 19. Namely, the speaker 19 enables audio information to be presented to the driver from a sound field established within the space. The speaker 19 is any device capable of emitting sound, and is not limited to being mounted in the headrest 22 as illustrated in FIG. 3. For example, the speaker 19 may be installed at any position within the vehicle. The configuration of the speaker 19 is also not limited thereto, and may adopt another known configuration.

In cases in which there is another vehicle travelling in the vicinity of the ego vehicle while the ego vehicle is travelling, it is sometimes preferable to notify the occupant of the ego vehicle with information about the other vehicle, such as that there is another vehicle traveling in the vicinity. However, it is difficult for the occupant to notice if information is presented using light or images and the information is presented at a position not readily noticed by the occupant. Moreover, if, for example, the other information to be presented to the occupant by light or images is in addition to presenting emergency information or cautionary information using light or images, the amount of information to be visually checked by occupant increases along with the increase in the other information presented to the occupant, with this sometimes causing the occupant to feel pressured. However, sometimes the occupant is caused to feel pressured even in cases in which sound is proactively emitted to present the occupant with the information related to another vehicle. For example, in cases in which the other information to be presented to the occupant by sound is in addition to emergency information and cautionary information being presented by sound, then the amount of information heard by the occupant increases along with the increase in the other information presented to the occupant, with this sometimes causing the occupant to feel pressured.

Namely, when information is presented to the occupant of the ego vehicle by emitting a particular light, such as light arising from a lamp of a predetermined color turning ON or blinking, or by emitting a particular sound, such as sound arising from a combination of sounds at predetermined frequencies and intervals, the senses of the occupant are proactively stimulated, and sometimes the occupant is caused to feel pressured by the stimulation.

However, in the present exemplary embodiment, information related to the other vehicle, such as the fact that the other vehicle is travelling in the vicinity, is presented as sound to the occupant of the ego vehicle. Presenting the information related to the other vehicle using sound suppresses the presentation of visually perceived information, such as light, and this is effective in suppressing interference with other conditions to be visually confirmed by the occupant. Moreover, in cases in which the information related to another vehicle is presented as sound, the information is presented by attenuating the current state of sound heard by the occupant, rather than presenting the information by proactively stimulating the senses of the occupant using a predetermined sound. Presenting information by employing a sound attenuated from the current state enables the degree of any pressured feeling felt by the occupant to be lessened.

Namely, in comparison to cases in which the state of sensory stimulation applied to the occupant is intensified from the current situation, employing a less intense sensory stimulation than the current situation lessens the degree of any pressured feeling felt by the occupant. For example, when notifying the occupant with information related to the other vehicle, notification by transitioning the acoustic environment from the acoustic environment currently being heard by the occupant to a nearly soundless acoustic environment lessens any pressured feeling felt in comparison to notification by sound emission, and enables presentation of the information related to another vehicle.

In the on-board device 10 according to the present exemplary embodiment, when another vehicle is detected by the on-board camera 13 of the surrounding conditions detection section 12, the sound heard by the driver is picked up by the microphone 15 of the occupant state detection section 14. Based on audio pick-up information of the picked up sound, the presentation controller 17 of the control device 16 generates audio information (for example audio information having the opposite phase to the audio pick-up information of the picked up sound) to attenuate the sound heard by the driver, and outputs the generated audio information to the speaker 19 of the sound source 18. Emitting sound based on the input audio information using the speaker 19 of the sound source 18 enables the sound heard by the driver to be attenuated. Thereby, the information related to another vehicle in the vicinity of the ego vehicle can be presented to the driver without causing the driver to feel pressured.

Moreover, in the present exemplary embodiment, when the sound heard by the driver is attenuated, the degree of attenuation (attenuation rate) of sound is made to differ according to importance of the information, representing a need to elicit the attention of the occupant. Note that explanation is given of a case in the present exemplary embodiment in which, since the importance of the information is greater as the need to elicit the attention of the occupant rises, the attenuation rate is increased the higher the need to elicit the attention of the occupant.

FIG. 4 illustrates a relationship map 42 for an example of associations between importance of information and attenuation rate for attenuating sound.

In FIG. 4, the association between the importance and the attenuation rate are illustrated for each criterion. Criterion 1 is a case in which the attenuation rate is large when the importance of information is high, namely, a case in which an attenuation rate is set so as to exceed a predetermined attenuation rate. Criterion 2 is a case in which, the attenuation rate is small when the importance of information is low, namely, a case in which an attenuation rate is set to be a predetermined attenuation rate or less. The importance of information can be set according to the travel state of the other vehicle. Examples of the travel state of the other vehicle include a speed of the other vehicle, a relative speed between the other vehicle and the ego vehicle, an acceleration of the other vehicle, a relative acceleration between the other vehicle and the ego vehicle, a distance between the other vehicle and the ego vehicle, a relationship including a direction from the position of the other vehicle to the position of the ego vehicle, and a size of the other vehicle. The importance of information may be set according to at least one of these travel states of the other vehicle, or set according to a combination of two or more of these travel states, with attenuation rates set so as to correspond to each set importance.

Scenarios for Criterion 1 in FIG. 4 include an example in which the travel state is another vehicle travelling at a faster speed approaching the ego vehicle and overtaking the ego vehicle due to traveling at a faster speed than the ego vehicle, and an example in which the travel state of another vehicle is an approach of a large vehicle. Scenarios for Criterion 2 include an example in which the travel state is another vehicle approaching at about the same speed as the ego vehicle or another vehicle approaching at a speed slower than the ego vehicle.

Note that although FIG. 4 illustrates broadly defined cases of the Criterion 1 having a high importance, and the Criterion 2 having a low importance, the associations between importance and attenuation rate are not limited to the criteria illustrated in FIG. 4. For example, the importance of information may be set stepwise in three or more steps, or may be set so as to be continuous. A single criterion and a single attenuation rate may be set. Moreover, as the importance of information, the importance may be set for information including a travelling state of another vehicle predetermined to be safely perceived by the driver, or for information including a travelling state of another vehicle predetermined as liable to surprise the driver, and an attenuation rate different to those of other travel states then set so as to be associated with the set importance.

Moreover, in the present exemplary embodiment, when attenuating the sound heard by the driver, it is the sound from the direction of the other vehicle toward the ego vehicle that is attenuated. Namely, information related to the other vehicle to be presented to the driver preferably includes presenting the position of the other vehicle or the direction of the other vehicle. The travel state of the other vehicle includes a positional relationship to the ego vehicle. Thus, by attenuating sound from the other vehicle toward the ego vehicle, information including the positional relationship of the other vehicle with respect to the ego vehicle can be presented to the driver, enabling the driver to be made aware of information related to the other vehicle in a more precise manner.

FIG. 5 illustrates a scenario map 44 of an example of sound attenuation presentation modes for information to be conveyed to the driver.

FIG. 5 illustrates sound attenuation presentation modes as operation scenarios, through associations of patterns of presentation direction corresponding to positions to present information by attenuated sound and associated attenuation rates. Explanation follows regarding a case in which the ego vehicle is a right hand drive vehicle. Operation scenario 1 is an operation scenario representing a case in which the sound heard by the driver on the right side is attenuated and information is conveyed by a large attenuation rate. Operation scenario 2 is an operation scenario representing a case in which the sound heard by the driver at the center is attenuated and information is conveyed by a small attenuation rate. Operation scenario 3 is an operation scenario representing a case in which the sound heard by the driver on the left side is attenuated and information is conveyed by a small attenuation rate. The attenuation rates can be set in a similar manner to in the criteria illustrated in FIG. 4.

In the present exemplary embodiment, since the speakers 19 are installed at the left and right sides of the driver for attenuating the sound heard by the driver, it is difficult to attenuate sound at the center by using only one out of the speaker 19L on the left side or the speaker 19R on the right side. However, depending on the observation point in sound field localization, sound attenuation at the center can be accommodated by attenuating sound on both the left and right sides by equivalent amounts. Thus, in operation scenario 2, in order to attenuate sound heard by the driver at the center, sound at the center is attenuated by attenuating sound on both the left and right sides by the same amount.

A presentation direction pattern corresponding to a position to present information by attenuated sound can be set according to the travel state of the other vehicle with respect to the ego vehicle. In the example illustrated in FIG. 5, a pattern at the center is set when the other vehicle is travelling at the rear of the ego vehicle, a pattern at the right side is set when the other vehicle is travelling at the rear right of the ego vehicle, and a pattern at the left side is set when the other vehicle is travelling at the left side of the ego vehicle. Note that the scenario content of the operation scenarios illustrated in FIG. 5 lists, as scenario content of operation scenario 1, an example of a travel state of another vehicle travelling at a speed faster than that of the ego vehicle so as to overtake the ego vehicle from the rear right. An example of a travel state of another vehicle travelling at the rear of the ego vehicle and approaching the ego vehicle at a speed slightly faster than that of the ego vehicle is listed as scenario content of operation scenario 2. Moreover, an example of a travel state of another vehicle that is a large vehicle travelling side-by-side on the left of the ego vehicle and slightly approaching the ego vehicle from the side-by-side travel state is listed as scenario content of operation scenario 3.

Next, explanation follows regarding information presentation control processing executed by the on-board device 10 according to the present exemplary embodiment.

Figure 6:
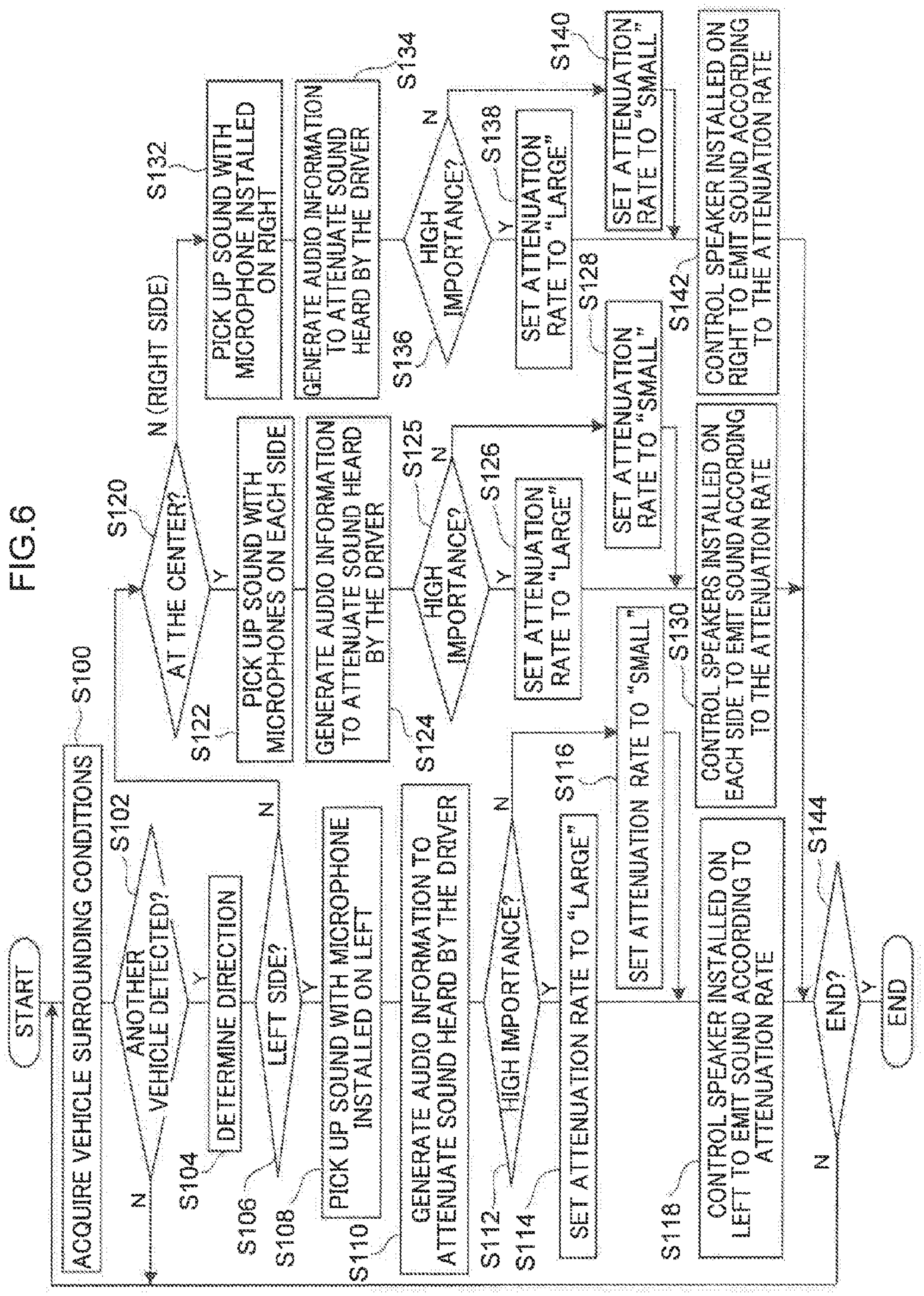
FIG. 6 is a flowchart according to the first exemplary embodiment, illustrating an example of a flow of processing executed by a controller.

FIG. 6 illustrates a flow of information presentation control processing executed by the on-board device 10. Explanation in the present exemplary embodiment is of a case in which the information presentation control program 36 is executed by the CPU 30 when, for example, an ignition switch is switched ON and the power source of the on-board device 10 is switched ON, such that the control device 16 illustrated in FIG. 2 functions as the presentation controller 17 (see FIG. 1).

First, at step S100, the presentation controller 17 acquires vehicle surrounding conditions based on images captured by the on-board camera 13 of the surroundings of the ego vehicle. Information representing the vehicle surrounding conditions acquired at step S100 includes information representing a processing result of processing to detect another vehicle based on the acquired captured images. Namely, in cases in which another vehicle was detected based on the captured images, the information representing the vehicle surrounding conditions includes information representing the detected other vehicle. The information representing the other vehicle includes information representing the size of the other vehicle. Moreover, the information representing the other vehicle includes information representing the travel state of the other vehicle. The information representing the travel state of the other vehicle includes information representing the position or direction of the other vehicle with respect to the ego vehicle. As the information representing the travel state of the other vehicle, the speed of the other vehicle or the relative speed of the other vehicle with respect to the ego vehicle may be derived from a time series of plural captured images, and the derived speed or relative speed included in the information representing the travel state of the other vehicle.

Next, at step S102, whether or not another vehicle has been detected is determined by determining whether or not the information representing the vehicle surrounding conditions acquired at step S100 includes information representing another vehicle. Processing returns to step S100 in cases in which determination at step S102 is negative, and processing transitions to step S104 in cases in which the determination is positive. At step S104, a direction to present information to the driver is determined. Namely, at step S104, based on the information representing the detected other vehicle, an information direction when presenting the driver with information using sound from the other vehicle toward the ego vehicle is identified as the direction to present information to the driver. More specifically, when the other vehicle has been detected on the right side of the ego vehicle, the direction to present information to the driver is determined as the “right side”. Similarly, when the other vehicle has been detected on the left side of the ego vehicle, the direction to present information to the driver is determined as the “left side”, and is determined as “at the center” when the other vehicle is detected at the rear of the ego vehicle.

At step S106, determination is made as to whether or not the determination result of the direction at step S104 is “left side”. Processing transitions to step S108 when the information direction is “left side” and determination at step S106 was positive. At step S108, audio information is acquired of sound heard by the driver on the left side and picked up by the microphone 15L installed on the left of the driver. Next, at step S110, the audio information is generated to attenuate sound heard by the driver on the left side. For example, audio information is generated representing sound of the opposite phase to the sound picked up by the microphone 15L.

Next, the attenuation rate of sound is set based on the relationship map 42 exemplified in FIG. 4, and the sound heard by the driver is attenuated according to the set attenuation rate. Namely, at step S112, determination is made as to whether or not the information has high importance, and the attenuation rate is set to “large” at step S114 when the information has high importance (when the determination at step S112 was positive). However, when the information has low importance (when the determination at step S112 was negative), the attenuation rate is set to “small” at step S116. In order to change the attenuation rate, for example, the amplitude of audio information representing sound of opposite phase can be changed. The attenuation rate decreases as the amplitude of the audio information is made smaller, and the attenuation rate increases as the amplitude of the audio information is made larger (up to the amplitude of the picked up audio information).

At step S118, the speaker 19L installed at the left of the driver is controlled. Namely, control is performed such that the sound arising from the audio information generated at step S110 is emitted to achieve the “large” or “small” attenuation rate set at step S114 or step S116. The sound emitted by the speaker 19L is sound of the opposite phase to the sound picked up by microphone 15L, and so the sound on the left side of the driver is sound attenuated by sound of the opposite phase, namely, the environmental sound heard up to this point is heard as attenuated sound. Thus, due to attenuation of the sound which was being heard by the driver, the driver can be made aware that another vehicle is travelling on the left side by attenuation of the sound, without causing the driver to feel pressured. Moreover, due to the sound emitted by the speaker 19L having the attenuation rate set to “large” or “small” according to importance, the driver can become aware of the importance of the information by the magnitude of the attenuated sound.

Next, at step S144, determination is made as to whether or not to end the information presentation control processing by determining whether or not the power source of the on-board device 10 has been disconnected. Processing returns to step S100 when the determination is negative, and the above processing is then repeated. However, the information presentation control processing illustrated in FIG. 6 is ended when the determination at step S144 is positive.

When the information direction determined at step S104 is something other than “left side” and the determination at step S106 was negative, processing transitions to step S120, and determination is made as to whether or not the information direction is “at the center”. Determination at step S120 is positive when the information direction is “at the center”, and, at step S122 to step S130, information is presented to make the driver aware that another vehicle is traveling at the rear.

More specifically, when the information direction is “at the center”, at step S122 the audio information respectively picked up for the sound heard by the driver on the left and right are each respectively acquired by the microphones 15R, 15L installed on each side of the driver. Then, at step S124, respective audio information is generated to attenuate the sound heard by the driver on the left and right, respectively.

Next, at step S125, similarly to at step S112, determination is made as to whether or not the importance of the information is high. When the importance of the information is high, similarly to at step S114, the attenuation rate is set to “large” at step S126. When the importance of the information is low, similarly to at step S116, the attenuation rate is set to “small” at step S128. Then, at step S130, the speakers 19R, 19L installed on the left and right of the driver are controlled. Namely, control is performed such that each of the sounds on the left and right arising from the audio information generated at step S124 is emitted to achieve the “large” or “small” attenuation rate set at step S126 or step S128. The sound emitted by the speaker 19R is sound of the opposite phase to the sound picked up by the microphone 15R, and the sound emitted by the speaker 19L is sound of the opposite phase to the sound picked up by the microphone 15L. Thus, the driver hears the sound respectively on the right side and the left side attenuated by sound of the opposite phase, enabling the driver to be made aware of another vehicle travelling at the rear which has been associated with the sound being attenuated on both the right side and the left side, without causing the driver to feel pressured. Moreover, due to the attenuation rate being set to "large" or "small" according to importance and the right and left speakers 19R, 19L each respectively emitting sounds, the driver can be made aware of the importance of the information by the magnitude of the attenuated sound Processing transitions to step S132 when the direction of the information determined at step S104 is "right side" and the determination at step S106 and step S120 is negative. At step S132, the audio information picked up for the sound heard by the driver on the right side is acquired by the microphone 15R installed on the right of the driver. Then, at step S134, similarly to at step S110, audio information is generated representing sound of opposite phase to the sound on the right side picked up by the microphone 15R.

Next, at step S136, similarly to at step S112, determination is made as to whether or not the importance of the information is high. When the importance of the information is high, similarly to at step S114, the attenuation rate is set to "large" at step S138. When the importance of the information is low, similarly to at step S116, the attenuation rate is set to "small" at step S140. Then, similarly to at step S118, the speaker 19R installed on the right of the driver is controlled at step S142. Namely, control is performed such that the sound arising from the audio information generated at step S134 is emitted to achieve the "large" or "small" attenuation rate set at step S138 or step S140. The sound emitted by the speaker 19R is sound of the opposite phase to the sound picked up by the microphone 15R, and the driver accordingly hears the sound on the right side attenuated by sound of the opposite phase, enabling the driver to be made aware of another vehicle travelling on the right side, without causing the driver to feel pressured. Moreover, due to the sound emitted by the speaker 19R being emitted so as to achieve the attenuation rate set to "large" or "small" according to importance, the driver can be made aware of the importance of the information by the magnitude of the attenuated sound.

As explained above, in the on-board device 10 of the present exemplary embodiment, when another vehicle has been detected by the on-board camera 13, the sound heard by the driver corresponding to the direction the other vehicle was detected in is picked up by the microphone 15. Based on the audio pick-up information of the picked up sound, audio information is then generated to attenuate the sound heard by the driver, and the audio information is output to the speaker 19 corresponding to the direction the other vehicle was detected in. Thereby, in the sound heard by the driver, the sound corresponding to the direction the other vehicle was detected in is attenuated by the sound emitted by the speaker 19. Due to the sound that was being heard by the driver being attenuated, the driver can be presented with information related to another vehicle travelling in the vicinity of the ego vehicle by the attenuation of sound, without causing the driver to feel pressured.

Namely, the driver hears the sound attenuated by the speaker 19. Sound is emitted by the speaker 19 so as to attenuate sound corresponding to the direction the other vehicle was detected in. The driver perceives that sound in the direction the other vehicle was detected in has decreased or been blocked from attenuation of the previous environmental sound. In this manner, presentation of information perceivable by an occupant is thereby enabled through the sound being heard becoming smaller or being attenuated, while suppressing any pressured feeling, enabling the occupant to easily be made aware of information related to the other vehicle.

Thus, in order to notify a driver with information related to another vehicle, presenting the information related to another vehicle by employing attenuated sound enables the degree of any pressured feeling felt by the driver to be suppressed to less than when notifying the driver by emitting a specific notification sound.

Moreover, presenting the information related to another vehicle using the attenuated sound enables mixing up by the driver of the information related to another vehicle, with any information prompting a warning or caution emitted by a specific sound, to be suppressed.

Second Exemplary Embodiment

Explanation follows regarding a second exemplary embodiment.

In the first exemplary embodiment, the information related to another vehicle was presented to the driver by attenuating sound corresponding to the direction the other vehicle was detected in using the microphones 15 and the speakers 19 installed at the left and right of the driver (see FIG. 3). In the second exemplary embodiment, the number of directions to attenuate sound in and to present information related to another vehicle to the driver is increased compared to in the first exemplary embodiment. Note that in the second exemplary embodiment, configuration the same as that of the first exemplary embodiment is appended with the same reference signs, and explanation thereof is omitted.

Figure 7:
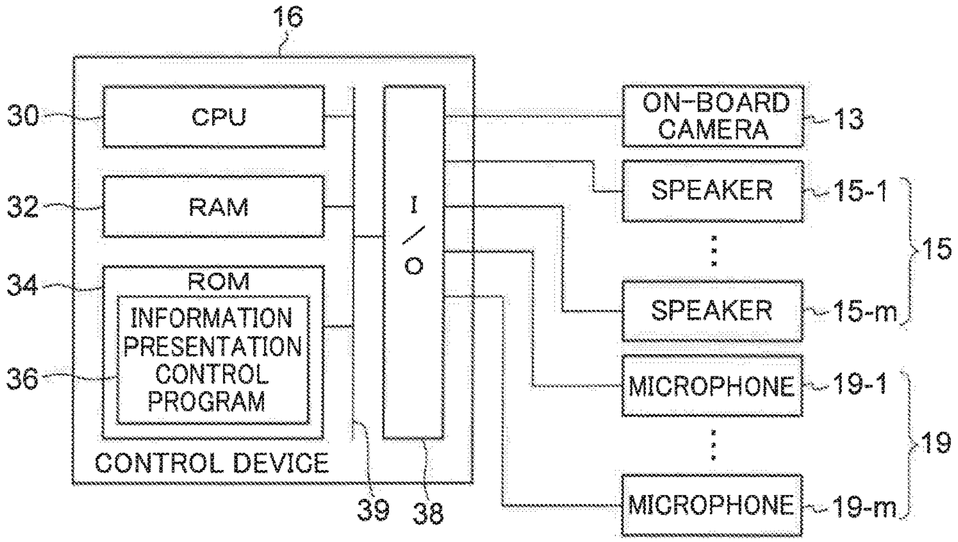
FIG. 7 a block diagram according to a second exemplary embodiment, illustrating an example of a schematic configuration of a control device.

FIG. 7 illustrates an example of a schematic configuration in a case in which a control device 16 according to the present exemplary embodiment is implemented by a computer. As illustrated in FIG. 7, plural microphones 15-1 to 15-*m* serving as the microphone 15, and plural speakers 19-1 to 19-*m* serving as the speaker 19 are connected to an I/O 38 of the control device 16 according to the present exemplary embodiment. In the present exemplary embodiment, explanation follows regarding a case in which there are, for example, eight microphones 15-1 to 15-8 (m=8), and eight speakers 19-1 to 19-8 (m=8) installed around the driver.

Figure 8:
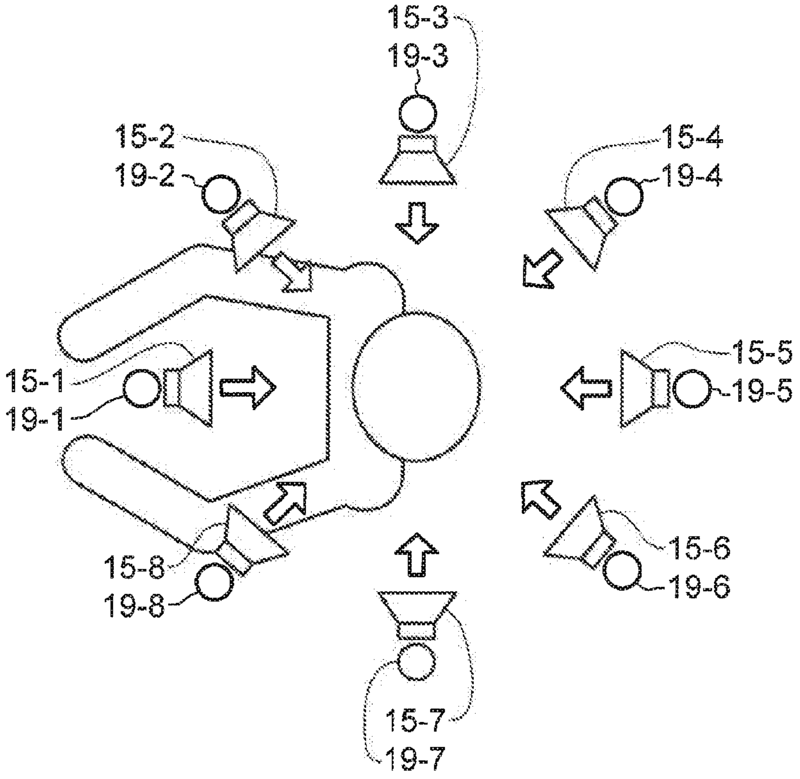
FIG. 8 is a block diagram illustrating an example of an arrangement according to the second exemplary embodiment of microphones and speakers installed in a vehicle.

FIG. 8 illustrates an example of an arrangement of the microphones 15 and the speakers 19 installed in a vehicle.

As illustrated in FIG. 8, the microphone 15-1 and the speaker 19-1 are installed in front of the driver, and the microphone 15-5 and the speaker 19-5 are installed at the rear of the driver. The microphone 15-3 and the speaker 19-3 are installed at the right of the driver, and the microphone 15-7 and the speaker 19-7 are installed at the left of the driver. Moreover, the microphone 15-2 and the speaker 19-2 are installed at the front right of the driver, and the microphone 15-8 and the speaker 19-8 are installed at the front left of the driver. Furthermore, the microphone 15-4 and the speaker 19-4 are installed at the rear right of the driver, and the microphone 15-6 and the speaker 19-6 are installed at the rear left of the driver.

The present exemplary embodiment is the same as the first exemplary embodiment (see also FIG. 4) regarding the point that the degree of attenuation (attenuation rate) of sound is made to differ according to importance of the information, representing a need to elicit the attention of the occupant, and so explanation thereof is omitted.

In the present exemplary embodiment, due to there being the eight microphones 15 and speakers 19 installed around the driver, when the sound heard by the driver is attenuated, the information related to another vehicle can be presented to the driver more finely by presentation at the position of the other vehicle or the direction of the other vehicle than when the microphones 15 and the speakers 19 are installed at the left and right of the driver.

FIG. 9 illustrates a scenario map 46 of an example of sound attenuation presentation modes for information to be conveyed to the driver in the present exemplary embodiment.

In FIG. 9, similarly to the scenario map 44 illustrated in FIG. 5, illustrates sound attenuation presentation modes as operation scenarios, through associations of patterns of presentation direction corresponding to positions to present information by attenuated sound and associated attenuation rates. Respective attenuation rates corresponding to operation scenario 1 to operation scenario 3 are similar to those of the scenario map 44 illustrated in FIG. 5. Due to installation of the eight microphones 15 and speakers 19, the travel state of another vehicle is measured and the patterns of direction to present information according to the present exemplary embodiment can be set more finely.

More specifically, in the operation scenario 1, to represent a state in which another vehicle at the rear right of the ego vehicle and at a faster speed than the ego vehicle is trying to overtake, the direction is transitioned in turn from "rear", to "rear right", to "right", to "front right" according to the travel state of the other vehicle, namely, according to the position of the other vehicle. Attenuating sound for each direction transitioned in this manner can be achieved by employing the eight microphones 15 and the eight speakers 19. Namely, attenuating the sound for "rear" can then be achieved using the microphone 15-5 and the speaker 19-5 installed at the rear of the driver. Then, attenuating the sound for "rear right" can be achieved using the microphone 15-4 and the speaker 19-4 installed at the rear right of the driver. Moreover, attenuating the sound for "right" can be achieved using the microphone 15-3 and the speaker 19-3 installed at the right of the driver. Then, attenuating the sound for "front right" can be achieved using the microphone 15-2 and the speaker 19-2 installed at the front right of the driver.

In the operation scenario 2, to represent a state in which another vehicle at the rear is approaching at a slightly faster speed than that of the ego vehicle, the sound for "rear" can be attenuated using the microphone 15-5 and the speaker 19-5 installed at the rear of the driver from out of the eight microphones 15 and speakers 19.

In the operation scenario 3, to represent a state in which another vehicle is a large vehicle travelling side-by-side on the left of the ego vehicle, and travelling so as to slightly approach the ego vehicle, a common effect is imparted for directions "rear left", "left", and "front left" that accord with the travel state of the other vehicle, namely accord with the position of the other vehicle. Thus, by attenuating sound in a common manner for each of the directions in which a common effect is imparted, presentation is enabled of information corresponding to the travel state of the other vehicle. Namely, the common attenuation of sound at the "rear left", "left", and "front left" can be achieved by employing the microphones 15-6, 15-7, 15-8 and the speakers 19-6, 19-7, 19-8 installed at the rear left, left, and front left of the driver.

Next, explanation follows regarding information presentation control processing executed by the on-board device 10 according to the present exemplary embodiment.

Figure 10:
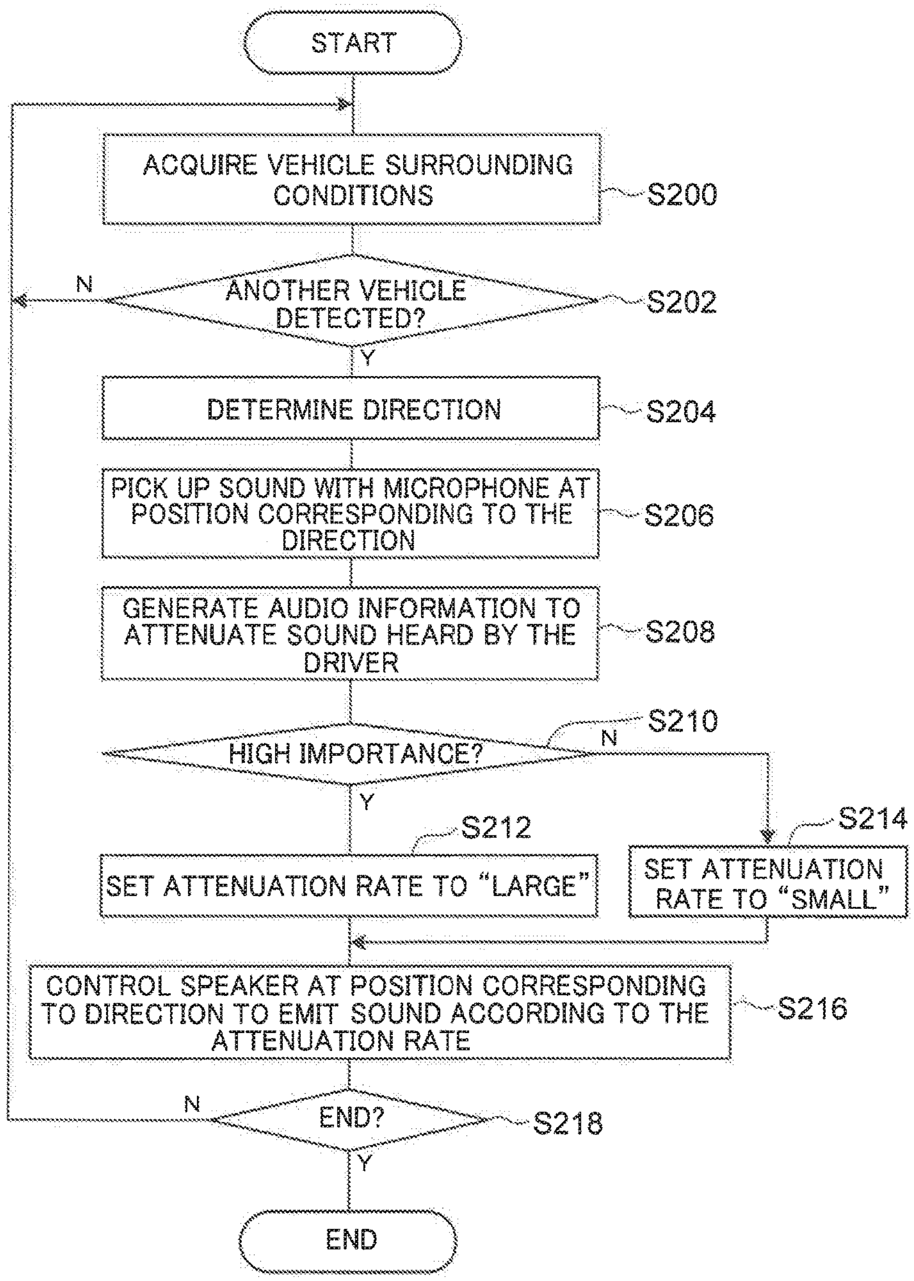
FIG. 10 is a flowchart according to the second exemplary embodiment, illustrating an example of a flow of processing executed by a controller.

FIG. 10 illustrates a flow of information presentation control processing executed by the on-board device 10 according to the present exemplary embodiment.

First, at step S200, similarly to at step S100 illustrated in FIG. 6, the presentation controller 17 acquires the vehicle surrounding conditions based on images captured by the on-board camera 13 of the ego vehicle surroundings. Next, at step S202, similarly to at step S102 illustrated in FIG. 6, whether or not another vehicle has been detected is determined by determining whether or not the information representing the vehicle surrounding conditions acquired at step S200 includes information representing another vehicle. Processing returns to step S200 in cases in which determination at step S202 is negative, and processing transitions to step S204 in cases in which the determination is positive. At step S204, a direction to present information to the driver is determined, similarly to in step S104 illustrated in FIG. 6.

Next, at step S206, the sound heard by the driver is picked up by the microphones 15 (for example, one of the microphone 15-1 to the microphone 15-8) at the position corresponding to the direction according with the determination result of direction at step S204 and audio information for the picked up sound is acquired. As illustrated in FIG. 8, for example, when the information direction is the "right side", audio information is acquired of the sound heard by the driver on the right side picked up by the microphone 15-3 installed on the right of the driver. Next, at step S208, audio information is generated to attenuate the sound heard by the driver. For example, when the information direction is the "right side", audio information is generated representing sound of opposite phase to the sound picked up by the microphone 15-3.

Then, an attenuation rate for sound is set based on the relationship map 46 exemplified in FIG. 9, and the sound heard by the driver is attenuated according to the set attenuation rate. Namely, similarly to at step S112 illustrated in FIG. 6, at step S210, determination is made as to whether or not the information has high importance, and the attenuation rate is set to "large" at step S212 when the information has high importance (when the determination at step S210 was positive). However, when the information has low importance (when the determination at step S210 was negative), the attenuation rate is set to "small" at step S214. Then, at step S216, the speaker 19 (one of the speakers 19-1 to 19-8) installed at the position corresponding to the direction of the direction determination result of step S204 is controlled. Namely, emission of the sound arising from the audio information generated at step S208 is controlled so as to achieve the "large" attenuation rate set at step S212 or with the "small" attenuation rate set at step S214.

Next, similarly to at step S144 illustrated in FIG. 6, determination is made at step S218 as to whether or not to end the information presentation control processing, by determining whether or not the power source of the on-board device 10 has been disconnected. Processing returns to step S200 when the determination is negative, and the above processing is repeated. However, the information presentation control processing illustrated in FIG. 10 is ended when the determination at step S218 is positive.

As explained above, in the on-board device 10 of the present exemplary embodiment, when another vehicle has been detected by the on-board camera 13, the sound heard by the driver is picked up by the microphone 15 corresponding to the direction the other vehicle was detected in from out of the eight microphones 15. Based on the audio pick-up information of the picked up sound, audio information is generated to attenuate the sound heard by the driver, and the generated audio information is output to the speaker 19 corresponding to the direction the other vehicle was detected in from out of the eight speakers 19. Accordingly, from out of the sound heard by the driver, the sound in a finely defined direction the other vehicle was detected in is attenuated by the sound emitted by the speaker 19, enabling finely defined and clear information related to another vehicle in the vicinity of the ego vehicle to presented to the driver without causing the driver to feel pressured.

Thus, as the number of the microphones 15 and the speakers 19 installed increase, information can be provided to the driver in many directions while suppressing the degree of any pressured feeling felt by the driver.

In the present exemplary embodiment, the eight microphones 15-1 to 15-8 and the speakers 19-1 to 19-8 are installed around the driver and are respectively employed to attenuate sound, enabling easy application to cases in which information related to plural other vehicles is to be presented simultaneously.

Note that although explanation has been given in each of the above exemplary embodiments of processing performed by executing a program representing a flow of processing performed in the control device 16, the processing of the program may be implemented by hardware.

Moreover, the processing performed in the control device 16 in the above exemplary embodiments may be stored and distributed as a program on a storage medium or the like.

In the above exemplary embodiments, although explanation has been given of cases in which the present disclosure is applied to an ego vehicle being steered by a driver, there is no limitation to providing information while the ego vehicle is being steered by a driver. For example, during autonomous driving under an automatic steering system that performs autonomous driving control processing to cause a vehicle to travel automatically, information may be presented by the on-board device 10 according to a state of a detected vehicle or according to a state of the driver.

Note that although explanation has been given in each of the above exemplary embodiments of cases in which the driver is an example of an occupant, the present disclosure is applicable to any occupant riding in a vehicle.

A vehicle information presentation device of a first aspect includes an acquisition section configured to acquire information about the surroundings of an ego vehicle, a sound pick-up section configured to pick up sound heard by an occupant, plural sound sources configured to emit sound toward the occupant, and a presentation section. When another vehicle has been detected in the surroundings information acquired by the acquisition section, the presentation section presents the occupant with information related to the other vehicle by, based on audio pick-up information of sound picked up by the sound pick-up section, attenuating sound from the other vehicle direction toward the ego vehicle out of the sound heard by the occupant with sound emitted from at least one of the sound sources from out of the plural sound sources emitting sound.

According to the first aspect, the ego vehicle surrounding information is acquired by the acquisition section, and the sound heard by the occupant is picked up by the sound pick-up section. When another vehicle has been detected from the surroundings information acquired by the acquisition section, the presentation section presents the occupant with information related to the other vehicle using sound emitted from at least one of the sound sources from out of the plural sound sources emitting sound toward the occupant, based on the audio pick-up information of sound picked up by the sound pick-up section. In such cases, the presentation section attenuates the sound from the other vehicle toward the ego vehicle from out of the sound heard by the occupant. For example, as the sound from the other vehicle toward the ego vehicle from out of the sound heard by the occupant, sound from the position of the detected other vehicle toward the ego vehicle is picked up by sound pick-up section, and the presentation section controls at least one sound source from out of plural sound sources so as to emit sound toward the occupant of opposite phase to the picked up sound. The sound from the direction of the other vehicle toward the ego vehicle is thereby attenuated by the sound emitted from the sound source before being heard by the occupant. This accordingly enables the occupant to be presented with perceptible information using the attenuated sound from the direction of the other vehicle toward the ego vehicle, enabling the occupant to be made aware of information related to the other vehicle in the ego vehicle surrounding conditions through the perceptible information using the attenuated sound, without the occupant feeling pressured.

A second aspect is the vehicle information presentation device of the first aspect, configurable such that the surroundings information includes information representing a travel state of another vehicle traveling in the vicinity of the ego vehicle, and the presentation section makes the magnitude of attenuation rate to attenuate the sound different according to the travel state, and presents the occupant with the travel state of the other vehicle by the sound attenuated according to the attenuation rate.

According to the second aspect, the presentation section makes the magnitude of attenuation rate to attenuate the sound different according to the travel state, and presents the occupant with the travel state of the other vehicle by the sound attenuated according to the attenuation rate. The occupant is thereby able to perceive differences in travel state of the other vehicle by the sound attenuated according to the attenuation rate.

A third aspect is the vehicle information presentation device of the second aspect, configurable such that the presentation section increases the attenuation rate the greater a need to elicit the attention of the occupant.

According to the third aspect, the attenuation rate is larger the greater the need to elicit the attention of the occupant. The occupant is thereby able to perceive the need to pay attention by the sound having a large attenuation rate, namely, by sound that has been greatly attenuated and approaches being soundless.

A fourth aspect is the vehicle information presentation device of the second aspect, configurable such that in cases in which the detected other vehicle is a vehicle overtaking the ego vehicle from the rear right, the presentation section makes the attenuation rate larger than cases in which the detected other vehicle is a vehicle approaching the ego vehicle from the rear or cases in which the detected other vehicle is a large vehicle traveling at the left side.

According to the fourth aspect, since the attenuation rate is larger in cases in which the other vehicle is a vehicle overtaking the ego vehicle from the rear right than cases in which the other vehicle is a vehicle approaching the ego vehicle from the rear or cases in which the other vehicle is a large vehicle traveling at the left side, information that the other vehicle is overtaking the ego vehicle from the rear right can be presented to the occupant more certainly as the information related to the other vehicle.

A fifth aspect is the vehicle information presentation device of any one of from the first aspect to the fourth aspect, configurable such that the plural sound sources are plural sound sources installed around the occupant.

According to the fifth aspect, since the plural sound sources are plural sound sources installed around the occupant, attenuated sound in a direction from the other vehicle toward the ego vehicle can be more easily emitted for presentation to the occupant.

According to the present disclosure as explained above, information related to another vehicle in the vicinity of the ego vehicle can be presented to an occupant without causing the occupant to feel pressured.

What is claimed is:

1. A vehicle information presentation device, comprising:

an acquisition section configured to acquire surrounding information about surroundings of an ego vehicle;

a sound pick-up section configured to pick up sound heard by an occupant;

a plurality of sound sources configured to emit sound toward the occupant; and a presentation section that, in a case in which another vehicle has been detected from the surroundings information acquired by the acquisition section, presents the occupant with information related to the other vehicle using the plurality of sound sources by attenuating sound emitted from a sound source that emits sound corresponding to a direction directed from the other vehicle toward the ego vehicle, based on audio pick-up information on sound picked up by the sound pick-up section wherein the surroundings information includes information representing a travel state of another vehicle traveling in a vicinity of the ego vehicle;

the presentation section varies a magnitude of an attenuation rate for attenuating the sound according to the travel state, and presents the occupant with the travel state of the other vehicle using the sound attenuated according to the attenuation rate; and the presentation section increases the attenuation rate in accordance with an increased need to elicit an attention of the occupant.

2. The vehicle information presentation device of claim 1, wherein, in a case in which the detected other vehicle is a vehicle overtaking the ego vehicle from a rear right, the presentation section makes the attenuation rate larger than a case in which the detected other vehicle is a vehicle approaching the ego vehicle from a rear or a case in which the detected other vehicle is a large vehicle traveling on a left.

3. The vehicle information presentation device of claim 1, wherein the plurality of sound sources is a plurality of sound sources installed around the occupant.

4. The vehicle information presentation device of claim 1, wherein:

a plurality of the sound pick-up sections are arranged so as to respectively correspond to each of the plurality of sound sources; and the plurality of sound sources and the plurality of sound pick-up sections are arranged at least at a rear right and rear left of the occupant.

5. The vehicle information presentation device of claim 4, wherein the plurality of sound sources and the plurality of sound pick-up sections are also arranged at a front, front right, front left, right, left, and rear of the occupant.

6. A vehicle information presentation method, comprising:

acquiring surrounding information about surroundings of an ego vehicle;

picking up sound heard by an occupant; and in a case in which another vehicle has been detected from the surroundings information, presenting the occupant with information related to the other vehicle using a plurality of sound sources configured to emit sound toward the occupant by attenuating sound emitted from a sound source that emits sound corresponding to a direction directed from the other vehicle toward the ego vehicle, based on audio pick-up information on the picked up sound heard by the occupant wherein the surroundings information includes information representing a travel state of another vehicle traveling in a vicinity of the ego vehicle;

the presenting is performed by varying a magnitude of an attenuation rate for attenuating the sound according to the travel state, and presents the occupant with the travel state of the other vehicle using the sound attenuated according to the attenuation rate; and the presenting is performed by increasing the attenuation rate in accordance with an increased need to elicit an attention of the occupant.

7. A non-transitory recording medium storing a program that causes a computer to execute a vehicle information presentation process, the process comprising:

acquiring surrounding information about surroundings of an ego vehicle;

picking up sound heard by an occupant; and in a case in which another vehicle has been detected from the surroundings information, presenting the occupant with information related to the other vehicle using a plurality of sound sources configured to emit sound toward the occupant by attenuating sound emitted from a sound source that emits sound corresponding to a direction directed from the other vehicle toward the ego vehicle, based on audio pick-up information of the picked up sound heard by the occupant, wherein the surroundings information includes information representing a travel state of another vehicle traveling in a vicinity of the ego vehicle;

the presenting is performed by varying a magnitude of an attenuation rate for attenuating the sound according to the travel state, and presents the occupant with the travel state of the other vehicle using the sound attenuated according to the attenuation rate; and the presenting is performed by increasing the attenuation rate in accordance with an increased need to elicit an attention of the occupant.

* * * * *